US012745063B1

(12) United States Patent
Sharp et al.

(10) Patent No.: US 12,745,063 B1
(45) **Date of Patent: *Sep. 22, 2026**

(54) METHODS AND SYSTEMS FOR PERSONALIZED INFORMATION CONTENT AND DELIVERY

(71) Applicant: United Services Automobile Association (USAA), San Antonio, TX (US)

(72) Inventors: Sakina Hassonjee Sharp, San Antonio, TX (US); JoAnn Trevino, San Antonio, TX (US); Scott Shreder, San Antonio, TX (US); Roland Edmiston, Boerne, TX (US); Kristin Koch, San Antonio, TX (US); Nicholas Manzoli, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 252 days.

This patent is subject to a terminal disclaimer.

(21) Appl. No.: 18/774,746

(22) Filed: Jul. 16, 2024

Related U.S. Application Data

(63) Continuation of application No. 17/402,218, filed on Aug. 13, 2021, now Pat. No. 12,063,578, which is a (Continued)

(51) Int. Cl.
*H04W 4/18* (2009.01)
*G06F 16/9535* (2019.01)

(Continued)

(52) U.S. Cl.
CPC .......... *H04W 4/18* (2013.01); *G06F 16/9535* (2019.01); *G06F 16/9537* (2019.01);

(Continued)

(58) Field of Classification Search
CPC ......... H04W 4/18; H04W 4/023; H04W 8/18; H04W 12/06; H04W 4/02; H04W 4/021; H04W 12/02; H04W 4/028; H04W 4/20; H04W 8/245; H04W 4/185; H04W 88/02; H04W 4/025; H04W 92/08; H04W 4/027; H04W 68/00; H04W 48/04; H04W 48/14;

(Continued)

(56) References Cited

U.S. PATENT DOCUMENTS 9,942,736 B1 4/2018 Sharp et al.
10,237,707 B1 3/2019 Sharp et al.

(Continued)

OTHER PUBLICATIONS

U.S. Appl. No. 17/402,218, filed Aug. 13, 2021, Methods and Systems for Personalized Information Content and Delivery.

(Continued)

*Primary Examiner* — Nimesh Patel
(74) *Attorney, Agent, or Firm* — Ashurst Perkins Coie US LLP

(57) ABSTRACT

Methods and systems described in this disclosure are directed to creating a profile for a user that includes information content rules and information delivery rules. Upon detecting a triggering event, a set of information is created for the user based on the information content rules. The information is delivered to the user according to the information delivery rules.

17 Claims, 6 Drawing Sheets

Related U.S. Application Data continuation of application No. 16/691,410, filed on Nov. 21, 2019, now Pat. No. 11,128,994, which is a continuation of application No. 16/261,406, filed on Jan. 29, 2019, now Pat. No. 10,506,391, which is a continuation of application No. 15/901,504, filed on Feb. 21, 2018, now Pat. No. 10,237,707, which is a continuation of application No. 15/452,042, filed on Mar. 7, 2017, now Pat. No. 9,942,736.

(60) Provisional application No. 62/306,210, filed on Mar. 10, 2016.

(51) Int. Cl.

| | |
|---|---|
| ***G06F 16/9537*** | (2019.01) |
| ***G06Q 30/0251*** | (2023.01) |
| ***H04L 67/306*** | (2022.01) |
| ***H04W 4/02*** | (2018.01) |
| ***H04W 8/18*** | (2009.01) |
| ***H04W 12/06*** | (2021.01) |

(52) U.S. Cl.

CPC ....... *G06Q 30/0261* (2013.01); *H04L 67/306* (2013.01); *H04W 4/023* (2013.01); *H04W 8/18* (2013.01); *H04W 12/06* (2013.01)

(58) Field of Classification Search

CPC ......... H04W 52/0245; H04W 52/0251; H04W 52/0258; H04W 4/029; H04W 4/12; H04W 4/14; H04W 4/80; G06F 16/9535; G06F 16/9537; G06F 3/165; G06F 3/0482; G06F 16/4393; G06F 3/16; G06F 16/636; G06F 16/639; G06F 3/0481; G06F 2203/011; G06F 16/285; G06F 16/739; G06F 16/783; G06F 9/542; G06F 16/29; G06F 16/487; G06F 16/637; G06Q 30/0261; G06Q 30/0251; G06Q 30/0269; G06Q 30/0241; G06Q 30/0271; G06Q 50/22; G06Q 50/24; G06Q 50/01; G06Q 10/107; G06Q 30/0205; H04L 67/306; H04L 63/107; H04L 63/10; H04L 67/22; H04L 51/14; H04L 51/20; H04L 63/102; H04L 67/24; H04L 63/0227; H04L 12/1407; H04L 51/12; H04L 67/30; H04M 1/0218; H04M 1/0264; H04M 2250/20; H04M 1/6091; H04M 1/72569; H04M 1/72572; H04M 1/72533; H04M 2242/15; H04M 2250/10; H04M 3/42348; H04M 15/66; H04M 15/8033; H04M 1/72577; H04M 2250/02; H04M 2250/04; H04M 2250/12; H04M 3/42017; H04N 2007/145; H04N 21/44218; H04N 21/4532; H04N 21/4667

See application file for complete search history.

(56) References Cited

U.S. PATENT DOCUMENTS

| | | | |
|---|---|---|---|
| 10,506,391 | B1 | 12/2019 | Sharp et al. |
| 11,128,994 | B1 | 9/2021 | Sharp et al. |
| 2005/0272445 | A1 | 12/2005 | Zellner |
| 2006/0014532 | A1 | 1/2006 | Seligmann |
| 2008/0110322 | A1 | 5/2008 | Lee |
| 2008/0207182 | A1 | 8/2008 | Maharajh |
| 2009/0170532 | A1 | 7/2009 | Lee et al. |
| 2012/0172059 | A1 | 7/2012 | Kim |

OTHER PUBLICATIONS

U.S. Appl. No. 16/691,410 U.S. Pat. No. 11,128,994, filed Nov. 21, 2019 Sep. 21, 2021, Methods and Systems for Personalized Information Content and Delivery.

U.S. Appl. No. 16/261,406 U.S. Pat. No. 10,506,391, filed Jan. 29, 2019 Dec. 10, 2019, Methods and Systems for Personalized Information Content and Delivery.

U.S. Appl. No. 15/901,504 U.S. Pat. No. 10,237,707, filed Feb. 21, 2018 Mar. 19, 2019, Methods and Systems for Personalized Information Content and Delivery.

U.S. Appl. No. 15/452,042 U.S. Pat. No. 9,942,736, filed Mar. 7, 2017 Apr. 10, 2018, Methods and Systems for Personalized Information Content and Delivery.

U.S. Appl. No. 62/306,210, filed Mar. 10, 2016, Methods and Systems for Personalized Information Content and Delivery.

METHODS AND SYSTEMS FOR PERSONALIZED INFORMATION CONTENT AND DELIVERY

CROSS-REFERENCE TO RELATED APPLICATIONS

This application is a continuation of U.S. patent application Ser. No. 17/402,218, filed on Aug. 13, 2021, now allowed, which is a continuation of U.S. patent application Ser. No. 16/691,410, filed on Nov. 21, 2019, entitled "METHODS AND SYSTEMS FOR PERSONALIZED INFORMATION CONTENT AND DELIVERY," issued as U.S. Pat. No. 11,128,994 on Sep. 21, 2021, which is a continuation of U.S. patent application Ser. No. 16/261,406, filed on Jan. 29, 2019, entitled "METHODS AND SYSTEMS FOR PERSONALIZED INFORMATION CONTENT AND DELIVERY," issued as U.S. Pat. No. 10,506,391 on Dec. 10, 2019, which is a continuation of U.S. patent application Ser. No. 15/901,504, filed on Feb. 21, 2018, entitled "METHODS AND SYSTEMS FOR PERSONALIZED INFORMATION CONTENT AND DELIVERY," issued as U.S. Pat. No. 10,237,707 on Mar. 19, 2019, which is a continuation of U.S. patent application Ser. No. 15/452,042, filed on Mar. 7, 2017, entitled "METHODS AND SYSTEMS FOR PERSONALIZED INFORMATION CONTENT AND DELIVERY," issued as U.S. Pat. No. 9,942,736, on Apr. 10, 2018, which is a non-provisional of and claims priority to U.S. Provisional Patent Application No. 62/306,210, filed on Mar. 10, 2016, entitled "METHODS AND SYSTEMS FOR PERSONALIZED INFORMATION CONTENT AND DELIVERY," all of which are hereby incorporated by reference in their entireties for all purposes.

TECHNICAL FIELD

Various embodiments of the present disclosure generally relate to information management. More specifically, various embodiments of the present disclosure relate to methods and systems for personalized, automated collection and delivery of information.

BACKGROUND

Many companies provide customer access to customer accounts when the customer presents the proper credentials. The customer may log in to a mobile application or a website portal and check the status of a claim, account, transfer, trade, or other account activity. Sometimes, the user can call the company to request such information.

BRIEF DESCRIPTION OF THE DRAWINGS

Embodiments of the present disclosure will be described and explained through the use of the accompanying drawings in which.

DETAILED DESCRIPTION

Figure 1:
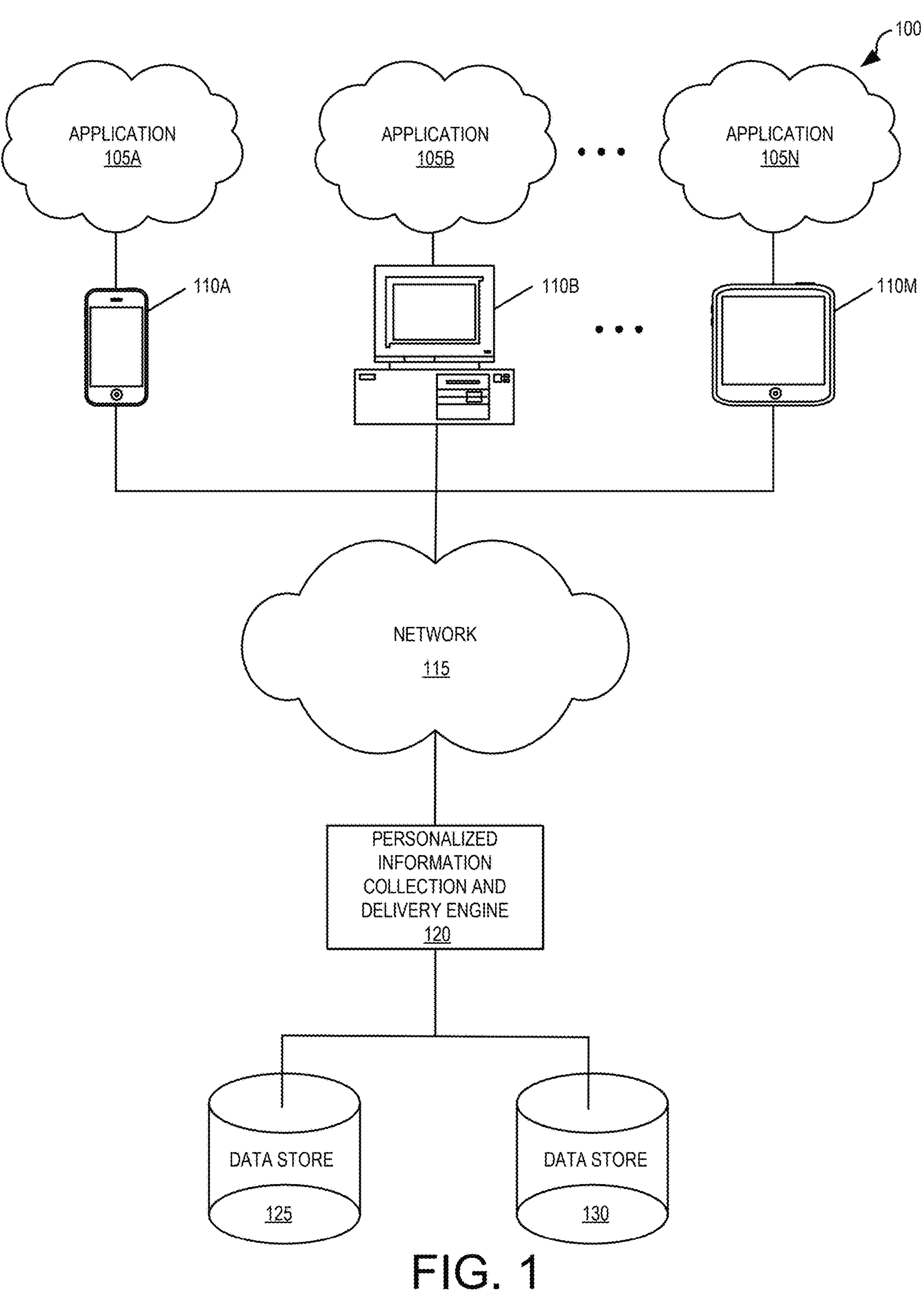
FIG. 1 illustrates an example of a network-based operating environment in accordance with various embodiments of the present disclosure.

Various embodiments of the present disclosure generally relate to information management. More specifically, various embodiments of the present disclosure relate to methods and systems for personalized, automated collection and delivery of information.

Many companies provide customer access to customer accounts when the customer presents the proper credentials. The customer may log in to a mobile application or a website portal and check the status of a claim, account, transfer, trade, bill payment, or other account activity. Sometimes, the user can call the company to request such information. However, receiving such information by means of calling or reading requires inconvenient action (e.g., dialing, reading) on the part of the user. Systems and methods disclosed herein gather and deliver customized information to the customer with little to no effort from the customer. Allowing users to receive such information without logging into an account (e.g., on the way to work, while working out at the gym) provides better options for staying aware of what is happening in the user's internal (e.g., personal accounts, credit cards) and external (e.g., stock market, financial trends) financial world.

A profile can be created by or for a user that includes information content rules and information delivery rules to create and deliver personalized financial updates to the user. The updates can be delivered to the user when the user typically could not receive such information (e.g., while working out at the gym, grocery shopping, commuting to and from work, skiing, waiting in line, cooking dinner).

The information content rules and the information deliver rules determine the personalized information to be gathered for a user and how to deliver the information to the user. The personalized information can include information such as a status of an account, financial advice, a reminder to pay a bill, a reminder to deposit a check, a warning regarding the account, a recap of spending over a period of time, or an advertisement of a product or service. The information may be based on factors such as the location of the user, content of information last sent to the user, preferences, priority of the information, and categories of information.

A trigger (e.g., location of the user, time of day, word or phrase spoken into a device) can be detected, signaling that the information should be created (if it is not already created) and delivered to the user's device. The information delivery rules can determine which device (e.g., vehicle, mobile device, tablet) to deliver the information to and how (e.g., podcast, webcast, audio file, video file) it should be delivered. In some embodiments, prior to delivery of the information, the user must provide authentication credentials. When the authentication credentials are incorrect, the information will not be provided to the user. However, when the authentication credentials are correct, the user can access the information. In some embodiments, various levels of authentication can be used (e.g., if the information is confidential, more the user is required to provide certain credentials). In some embodiments, when another person is detected in an area of the user, the information delivery rules may prohibit the user from receiving the information until authentication credentials are received.

In an example, the user may typically receive a financial update while on the way to work. When the user's vehicle or mobile device is detected to be at a specific intersection around a certain time (e.g., 7:15 a.m.), the user can receive the update. Depending on the day of the week or occurrences in the user's finances, the user may receive different types of information (e.g., spending report, account summary, stock trends). The user can receive the information via the user's radio, vehicle, mobile device, and/or computer in various manners (e.g., podcast, video chat, webcast). The method of delivery can depend on factors such as the user's location, the type of information, user preferences, time of day, and presence of others.

This disclosure describes systems and methods designed to increase the availability of customer information. Various embodiments may provide one or more of the following technological improvements: 1) improved efficiency in collecting and delivering information to users; 2) automation in delivering customer-specific information, resulting in fewer representative calls; 3) real-time or near real-time delivery of customer-specific information; and 4) an information collection and delivery process that is adaptable to multiple channels, including mobile applications, websites, podcasts, and radio channels, as well as devices such as smart appliances, and voice command devices (e.g., Amazon Echo).

In the following description, for the purposes of explanation, numerous specific details are set forth in order to provide a thorough understanding of embodiments of the present disclosure. However, to one skilled in the art, it will be apparent on reading the disclosure that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (e.g., a mobile device; a mobile phone; a telephone; a tablet computer; a mobile media device; a mobile gaming device; a vehicle-based computer; a dedicated terminal; a public terminal, a desktop, or a laptop computer; a kiosk; a wearable device such as a smartwatch). In some embodiments, applications 105A-105N may be stored on one or more computing devices 110A-110M or may be stored remotely on a server (in the "cloud"). These computing devices can include mechanisms for receiving and sending traffic by connecting through network 115 to personalized information collection and delivery engine 120 and data stores 125 and 130.

Computing devices 110A-110M may be configured to communicate via the network 115 with personalized information collection and delivery engine 120. In some embodiments, computing devices 110A-110M can retrieve or submit information to personalized information collection and delivery engine 120 and run one or more applications with customized content retrieved by personalized information collection and delivery engine 120 and data stores 125 and 130. For example, computing devices 110A-110M can execute a browser application or a customized client to enable interaction between the computing devices 110A-110M, personalized information collection and delivery engine 120, and data stores 125 and 130.

In some embodiments, personalized information collection and delivery engine 120 can be a server remotely located from the computing devices 110A-110M. Personalized information collection and delivery engine 120 can be running on one or more servers and can be used to generate user profiles with information content and delivery rules, detect and/or receive triggers for creation and delivery of content, gather and create content, deliver content, store user profiles and/or financial data in data stores 125 and 130, and/or perform other activities.

Network 115 can be any combination of local area and/or wide area networks, using wired and/or wireless communication systems. Network 115 can be, or could use, any or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transfer protocol (HTTP), simple mail transfer protocol (SMTP), and file transfer protocol (FTP). Data exchanged over network 115 may be represented using technologies, languages, and/or formats, including hypertext markup language (HTML) or extensible markup language (XML). In addition, all or some links can be encrypted using conventional encryption technologies such as secure sockets layer (SSL), transport layer security (TLS), and Internet Protocol security (IPsec).

Data stores 125 and 130 can be used to manage storage and access to data such as user profiles, location information, information that has been previously sent to the user, user preferences, financial and personal data, data received from third parties, and other information. Data stores 125 and 130 may be a data repository of a set of integrated objects that are modeled using classes defined in database schemas. Data stores 125 and 130 may further include flat files that can store data. Personalized information collection and delivery engine 120 and/or other servers may collect and/or access data from the data stores 125 and 130. Information provided by users can be stored in data stores 125 and 130.

Figure 2:
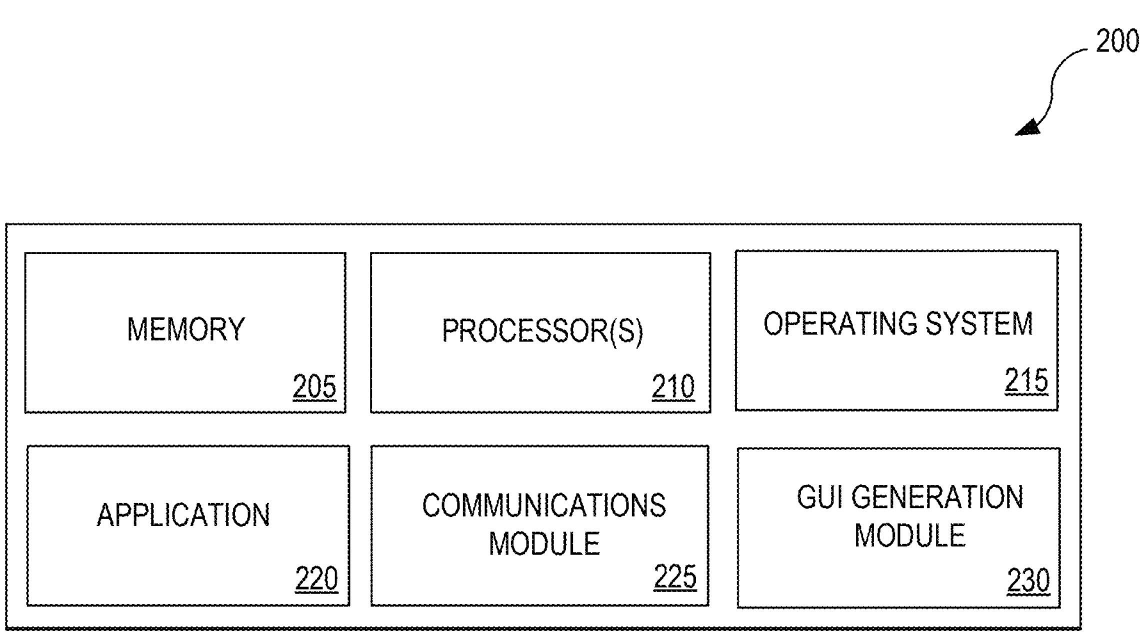
FIG. 2 illustrates various components of a computing device that may be used in accordance with various embodiments of the present disclosure.

FIG. 2 illustrates a set of components 200 within one or more computing devices 110A-110M of a user. According to the embodiments shown in FIG. 2, computing devices 110A-110M can include memory 205, one or more processors 210, operating system 215, application 220, communications module 225, and GUI generation module 230. Other embodiments of the present invention may include some, all, or none of these modules and components, along with other modules, applications, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of operating system 215, application 220, communications module 225, and GUI generation module 230. Generally, memory 205 can include any device, mechanism, or populated data structure used for storing information. In accordance with some embodiments of the present disclosure, memory 205 can encompass, but is not limited to, any type of volatile memory, nonvolatile memory (RAM), and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, EPROMS, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Operating system 215 can provide a software package that is capable of managing the hardware resources of computing devices 110A-110M. Operating system 215 can also provide common services for software applications running on processor(s) 210. In accordance with various embodiments, operating system 215 can coordinate resources for multiple applications 220 that allow a user to access and interact with personalized information collection and delivery engine 120. For example, application 220 can include an application for financial services, a money transfer application, a social networking application, and a gaming application.

Application 220 can access a server and/or a platform associated with an organization (e.g., personalized information collection and delivery engine 120) to receive data (e.g., a podcast of the status of an account a radio message that includes financial advice, a reminder to pay a bill and/or to deposit a check, a warning regarding the account, or an advertisement of a product or service); and display, request, and/or collect authentication information and confirmations. Application 220 can receive an authentication level from authentication module 340 required to allow the user to access the information, particularly if the information includes confidential information such as financial account status information, advice, or reminders. Application 220 may provide various methods of authentication (e.g., user identifier, password, code, fingerprint or other biometric). In some embodiments, authentication is unnecessary.

Communications module 225 facilitates communication with personalized information collection and delivery engine 120. Communications module 225 can use wireless communication methods such as a near field communication (NFC), Bluetooth, and Wi-Fi. Communications module 225 can receive the financial updates such as financial account status information, advice, reminders, advertisements, or other information from personalized information collection and delivery engine 120. In an example, the communications module 225 can receive a personalized podcast and transmit it via a radio channel.

In some embodiments, communications module 225 can determine the location of the user. Such information may trigger the content and delivery of information to the user. In some embodiments, communications module 225 can have geolocation (e.g., GPS) capabilities. In such embodiments, a user's computing device can determine a location of the user based on the geolocation capability and/or other information (e.g., network detection, visual indications, audio indications). This location information can be conveyed to personalized information collection and delivery engine 120. For example, communications module 225 may determine that the user is at the gym, at home, driving, or at a particular intersection.

GUI generation module 230 can generate one or more GUI screens that allow for interaction with a user. In at least one embodiment, GUI generation module 230 generates a graphical user interface receiving and/or conveying information (e.g., financial information, preferences for content and delivery of financial information) to the user's computing device 110A-110M.

Figure 3:
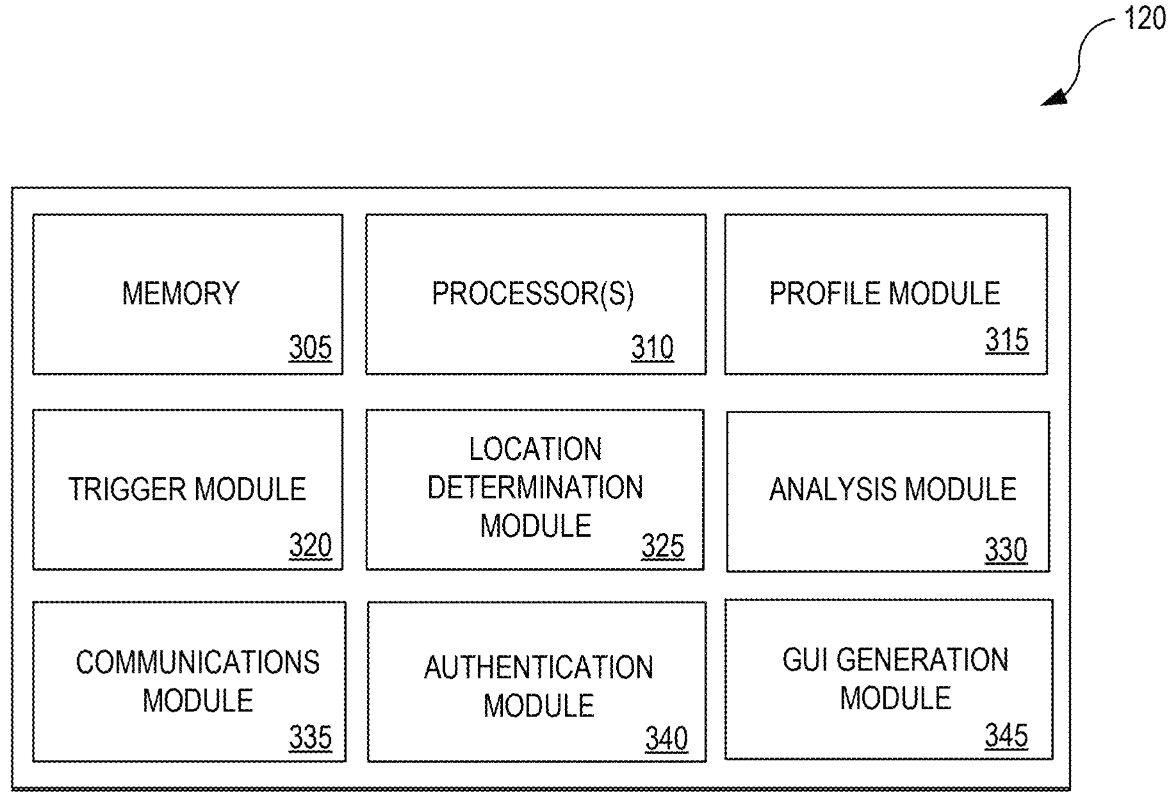
FIG. 3 illustrates various components of a personalized information collection and delivery engine that may be used in accordance with various embodiments of the present disclosure.

FIG. 3 illustrates a set of components 120 within a system such as personalized information collection and delivery engine 120. In some embodiments, these components can be included in a server maintained by the entity that owns and operates personalized information collection and delivery engine 120. According to the embodiments shown in FIG. 3, personalized information collection and delivery engine 120 can include memory 305, one or more processors 310, profile module 315, trigger module 320, location determination module 325, analysis module 330, communications module 335, authentication module 340, and GUI generation module 345. Other embodiments of the present invention may include some, all, or none of these modules and components, along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information, as described above for memory 205. Memory 305 can store instructions for running one or more applications or modules on processor(s) 310. For example, memory 305 could be used in one or more embodiments to house all or some of the instructions needed to execute the functionality of profile module 315, trigger module 320, location determination module 325, analysis module 330, communications module 335, authentication module 340, and GUI generation module 345.

Profile module 315 builds a profile for a user. The profile can include content rules that define what content is to be included in a delivery, including information that is typically found only after logging into an account. Content can include the status of an account, financial advice, a reminder to pay a bill, a reminder to deposit a check, a warning regarding an account, an advertisement of a product or service, or other information. Information can be collected from various sources such as insurance accounts, bank accounts, retirement accounts, websites, the user's communications, historical advice shared with the user, bill payees, and representative notes.

Profile module 315 can further include information delivery rules. Information delivery rules can govern how information is transmitted to the user and on what device (e.g., mobile device, vehicle intercom system, radio broadcast, podcast, webcast).

The content rules and the information delivery rules can include rules that define the information provided to the user and how the information is provided to the user. The information content and deliver may be based on one or more triggers, as well as other factors. Triggers may include a time of day (e.g., 7:00 a.m.) on a particular day of the week (e.g., Wednesday), a calendar day (e.g., 15th day of the month), a particular location (e.g., at a stoplight, at work, in the car), and a location of the user. The other factors may include the information that was previously sent, circumstances surrounding the user (e.g., is the user alone?), an amount of time the user has available, user preferences, and a priority of information.

Trigger module 320 can receive and/or detect information and triggers that begin the creation of information content for the user and the delivery of the content to the user. In an example, a trigger may include the user being present at a certain location (e.g., a certain intersection, the gym) at or around a certain time of day (e.g., between 7:30 a.m. and 8:30 a.m.). The location may be detected by location determination module 325. When the user is at a particular location, the information content rules may be triggered to create information for the user, and the information delivery rules may deliver the information in a certain format or to a certain device. As an example, if the user is at a certain stoplight at or around 8:00 a.m., the user may automatically receive an account update (e.g., "Your 401K gained $500 yesterday. Your 401K account has $35,000. You are on track to have $300,000 in your account by 2040."). The information delivery rules may dictate that the user receive the account update via a radio channel if the user is driving a certain vehicle or via the user's mobile device if the user is in a different vehicle. If the user is not at that particular location within the particular time period, the information content may not be sent to the user (e.g., the user may have a day off from work or may be traveling). Trigger module 320 provides trigger information to analysis module 330 to create the information content for the user.

Trigger module 320 can also receive information pertinent to information content and delivery. For example, trigger module 320 can receive or detect whether another party is present (e.g., detecting a second mobile device in the user's vehicle). Such information can be processed by analysis module 330 to determine whether the information should be modified or simply not delivered according to the content and information delivery rules.

In some embodiments, the trigger is receiving certain words from the user. For example, the user could say "Please give me an account status" and the user could receive a balance of all the accounts, a measure of how close the user is to over drafting and other account-related information. The trigger words may be defined by the user in the user's profile.

Location determination module 325 determines a location of the user and reports the location to trigger module 320. In some embodiments, the location may be received from communications module 225 and/or communications module 335. The user's location can be detected using various methods such as a Wi-Fi signal, an RFID signal, an NFC signal, a satellite signal, a cellular signal, or a Bluetooth signal.

Analysis module 330 takes the information collected (e.g., from trigger module 320, data in a database, other received information), applies the information content rules, and creates the content to be delivered to the user. Analysis module 330 may flag information in the database for follow-up. For example, if the user received advice to diversify the user's 401K, such information may be flagged in the database to check the user's 401K in one month to determine whether the user has adhered to the advice. If not, future information content can include the same suggestion. In some embodiments, analysis module 330 creates information content prior to receiving a trigger and delivers the information upon the trigger. In other embodiments, analysis module 330 creates the information content upon receiving the trigger (and includes information based upon the trigger).

Analysis module 330 can take the information collected (e.g., from trigger module 320, data in a database, other received information), apply the information delivery rules, and determine whether the information should be delivered to the user, and, if so, how the information should be delivered. In an example, if a second device is detected in the user's vehicle, the information delivery rules may prevent the information from being delivered, may change content before delivery, or may require authentication or heightened authentication before delivery. In other embodiments, information may indicate that the user is at home (e.g., home network is detected), and under such circumstances, the information delivery rules dictate that authentication is unnecessary and that the information can be delivered to the user through the user's home speaker system.

In some embodiments, analysis module 330 may determine that no information should be sent. For example, when the user's location is determined to be in a foreign country, or the user's calendar states that the user is on vacation, the information may not be provided to the user. In some embodiments, the information is presented to the user and the user has an opportunity to interact with an avatar. The avatar can offer advice, set up meetings, and/or gather additional information for the user.

Communications module 335 delivers the information according to the information delivery rules when a trigger is received from trigger module 320, and so long as authentication module 340 collects and verifies authentication credentials if needed.

Authentication module 340 receives information from analysis module 330 regarding a level of authentication needed for the user to access the information. The authentication level may depend on various factors such as a location of the user (e.g., determined by network 115, GPS, signal), a detection of other people or devices surrounding the user, identity of those surrounding the user, content of the information, and/or format of delivery.

GUI generation module 345 can generate one or more GUI screens that allow for interaction with a user. In at least one embodiment, GUI generation module 345 generates a graphical user interface receiving and/or conveying information to the user. For example, GUI generation module 345 may display the user's preferences, the devices associated with the user, and authentication information received or needed from the user.

Figure 4:
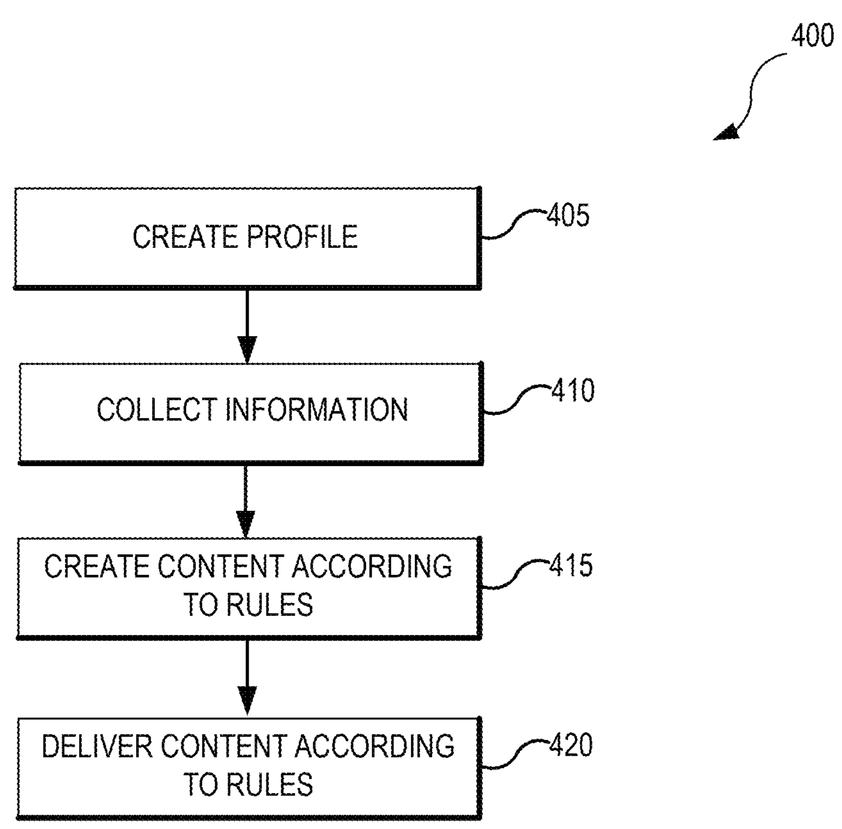
FIG. 4 is a flowchart illustrating a set of operations for personalized information collection and delivery in accordance with various embodiments of the present disclosure.
Figure 5:
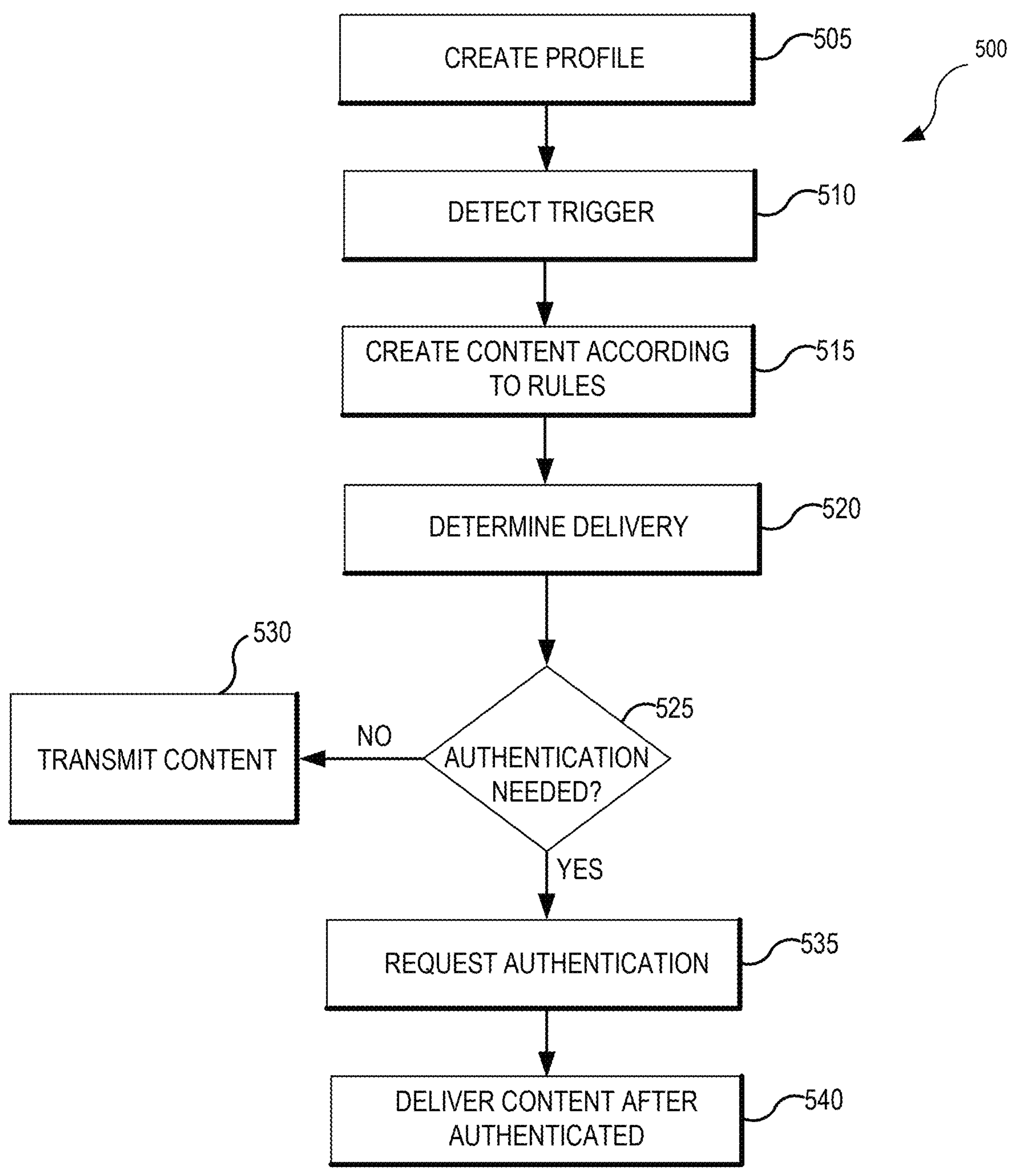
FIG. 5 is a flowchart illustrating a set of operations for personalized information collection and delivery in accordance with various embodiments of the present disclosure.

FIGS. 4-5 are flowcharts illustrating sets of operations for personalized information content and delivery. In some embodiments, fewer than all of the operations in each set of operations are performed, whereas in other embodiments additional operations are performed. Moreover, in some embodiments, the operations may be performed in different orders or in parallel. The operations can be performed by various components of personalized information collection and delivery engine 120 and device 200 such as those illustrated in FIG. 2 and/or FIG. 3.

FIG. 4 is a flowchart illustrating a set of operations 400 for creating and delivering personalized content to users. Creating operation 405 creates a profile of the information that the user would like to receive and how the user would like to receive the information. Collecting operation 410 collects information regarding what information has previously been sent to the user, what information should be sent (e.g., bills that are due shortly), and the surroundings of the user, including other devices/people. Creating operation 415 creates content according to one or more content rules, taking into consideration information collected. Delivering operation 420 delivers the content to the user according to a set of delivery rules.

FIG. 5 is a flowchart illustrating a set of operations 500 for creating and delivering personalized content to users. Creating operation 505 creates a profile of the information that the user would like to receive and how the user would like to receive the information. Detecting operation 510 detects a trigger (e.g., location of the user). Creating operation 515 creates content according to one or more content rules, taking into consideration information collected. Delivering operation 520 delivers the content to the user according to a set of delivery rules.

Decision operation 525 determines whether authentication is needed. When authentication is not needed, decision operation 525 branches to transmitting operation 530 where the content is transmitted. When authentication is needed, decision operation 525 branches to requesting operation 535 where authentication is requested. The type of authentication may be determined by information received in the trigger (e.g., location of user). Delivering operation 540 delivers the content after the user has been authenticated.

Computer System Overview

Figure 6:
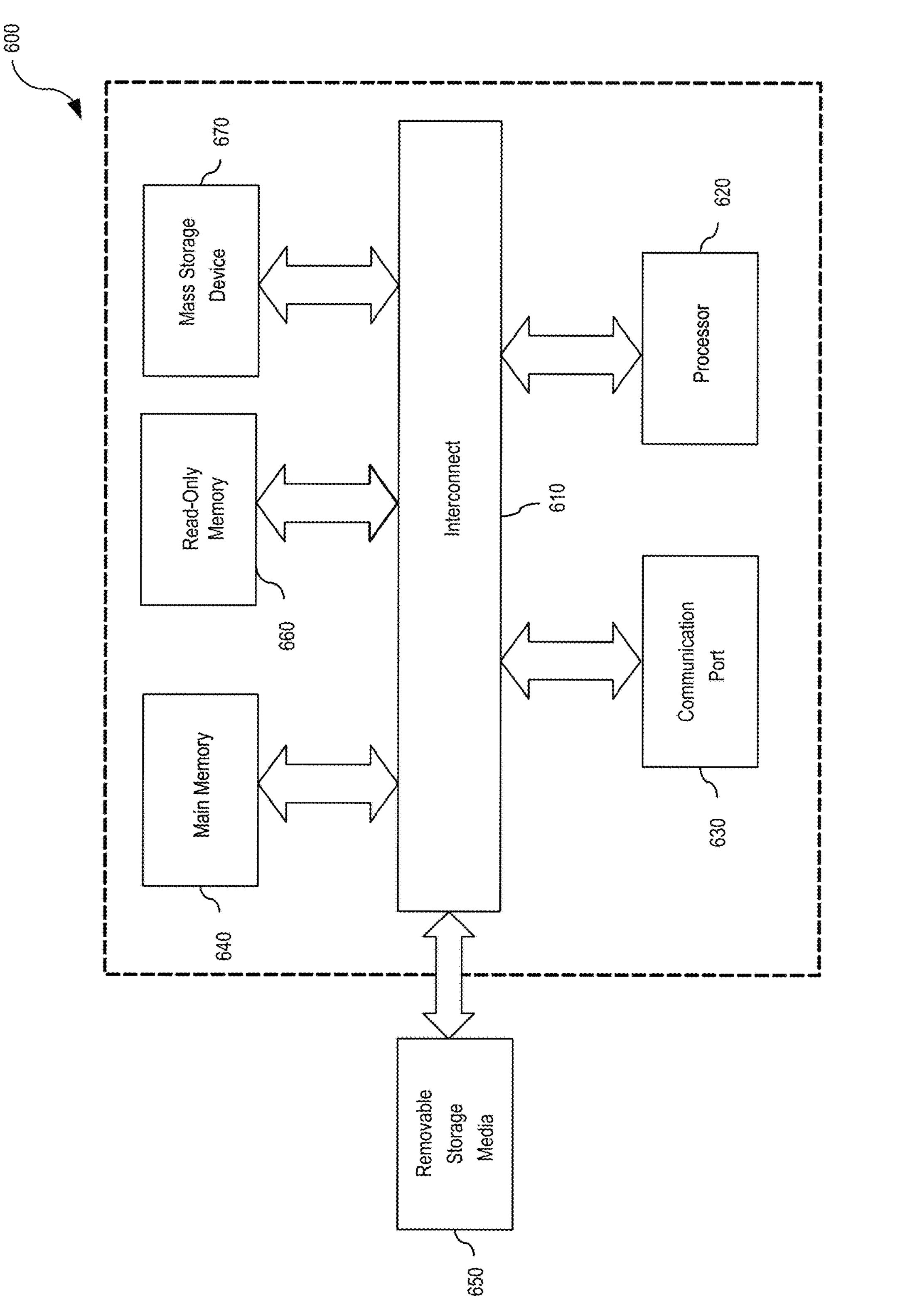
FIG. 6 illustrates an example of a computer system with which some embodiments of the present disclosure may be utilized.

Embodiments of the present disclosure include various steps and operations, which have been described above. A variety of these steps and operations may be performed by hardware components, or they may be embodied in machine-executable instructions that may be used to cause a general-purpose or special-purpose processor programmed with the instructions to perform the steps. Alternatively, the steps may be performed by a combination of hardware, software, and/or firmware. As such, FIG. 6 is an example of a computer system 600 with which embodiments of the present disclosure may be utilized. According to the present example, the computer system 600 includes an interconnect 610, at least one processor 620, at least one communication port 630, a main memory 640, a removable storage media 650, a read-only memory 660, and a mass storage device 670.

Processor(s) 620 can be any known processor, such as, but not limited to, an Intel® Itanium® or Itanium 2® processor(s), or AMD® Opteron® or Athlon MP® processor(s), or Motorola® lines of processors. Communication port(s) 630 can be any of an RS-232 port for use with a modem-based dial-up connection, a 10/100 Ethernet port, or a Gigabit port using copper or fiber. Communication port(s) 630 may be chosen, depending on a network such a Local Area Network (LAN), Wide Area Network (WAN), or any network to which the computer system 600 connects.

Main memory 6401140 can be Random Access Memory (RAM) or any other dynamic storage device(s) commonly known in the art. Read only memory 660 can be any static storage device(s), such as programmable read only memory (PROM) chips for storing static information, such as instructions for processor(s) 620.

Mass storage device 670 can be used to store information and instructions. For example, hard disks such as the Adaptec® family of SCSI drives, an optical disc, an array of disks such as RAID, the Adaptec family of RAID drives, or any other mass storage devices may be used.

Interconnect 610 communicatively couples processor(s) 620 with the other memory, storage, and communication blocks. Interconnect 610 can be a PCI/PCI-X—or SCSI-based system bus, depending on the storage devices used.

Removable storage media 650 can be any kind of external hard-drives, floppy drives, USB drives, IOMEGA® Zip Drives, Compact Disc-Read Only Memory (CD-ROM), Compact Disc-Re-Writable (CD-RW), or Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms “connected” or “coupled” and related terms are used in an operational sense and are not necessarily limited to a direct physical connection or coupling. Thus, for example, two devices may be coupled directly or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases “in some embodiments,” “according to some embodiments,” “in the embodiments shown,” “in other embodiments,” “embodiments,” and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature “may,” “can,” “could,” or “might” be included or have a characteristic, that particular component or feature is not required to be included or have the characteristic.

The term “responsive” includes completely or partially responsive.

The term “module” refers broadly to a software, hardware, or firmware (or any combination thereof) component. Modules are typically functional components that can generate useful data or other output using specified input(s). A module may or may not be self-contained. An application program (also called an “application”) may include one or more modules, or a module can include one or more application programs.

The term “network” generally refers to a group of interconnected devices capable of exchanging information. A network may be as few as several personal computers on a Local Area Network (LAN) or as large as the Internet, a worldwide network of computers. As used herein, “network” is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for personalizing information collection and delivery to a user. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A method comprising:

creating a profile for a user, wherein the profile includes information content rules and information delivery rules for receiving a set of information;

detecting, by a user device, a presence of one or more other devices based on at least one of an audio indication or a network detection;

in response to detecting the presence of the one or more other devices, receiving, by the user device, a request for authentication credentials in order to access the set of information;

entering, via the user device, the authentication credentials; and in response to the authentication credentials authenticating the user associated with the user device, receiving the set of information in a format that is based on the user device, and i) a time of day, or ii) at least one user preference of the user.

2. The method of claim 1, further comprising:

detecting, by the user device, the time of day; and in response to detecting the time of data, sending a trigger notification to receive the set of information.

3. The method of claim 1, further comprising:

detecting, by the user device, a location of the user; and in response to detecting the location of the user, sending a trigger notification to receive the set of information.

4. The method of claim 1, further comprising:

detecting, by the user device, a phrase spoken by the user; and in response to detecting the phrase spoken by the user, sending a trigger notification to receive the set of information.

5. The method of claim 1, further comprising:

detecting a location of the user device using at least one of: a Wi-Fi signal, an RFID signal, an NFC signal, a satellite signal, or a cellular signal.

6. The method of claim 1, wherein the set of information is delivered to the user device according to information content rules, wherein the information content rules determine the set of information based at least in part on a last transmitted set of information, a priority of the set of information, and a day of week.

7. A system comprising:

one or more processors; and one or more memories storing instructions that, when executed by the one or more processors, cause the system to perform a process comprising:

creating a profile for a user, wherein the profile includes information content rules and information delivery rules for receiving a set of information;

detecting, by a user device, a presence of one or more other devices based on at least one of an audio indication or a network detection;

in response to detecting the presence of the one or more other devices, receiving, by the user device, a request for authentication credentials in order to access the set of information;

entering, via the user device, the authentication credentials; and in response to the authentication credentials authenticating the user associated with the user device, receiving the set of information in a format that is based on the user device, and i) a time of day, or ii) at least one user preference of the user.

8. The system of claim 7, wherein the process further comprises:

detecting, by the user device, the time of day; and in response to detecting the time of data, sending a trigger notification to receive the set of information.

9. The system of claim 8, wherein the process further comprises:

detecting, by the user device, a location of the user; and in response to detecting the location of the user, sending a trigger notification to receive the set of information.

10. The system of claim 8, wherein the process further comprises:

detecting, by the user device, a phrase spoken by the user; and in response to detecting the phrase spoken by the user, sending a trigger notification to receive the set of information.

11. The system of claim 8, wherein the process further comprises:

detecting a location of the user device using at least one of: a Wi-Fi signal, an RFID signal, an NFC signal, a satellite signal, or a cellular signal.

12. The system of claim 8, wherein the set of information is delivered to the user device according to information content rules, wherein the information content rules determine the set of information based at least in part on a last transmitted set of information a priority of the set of information, and a day of week.

13. A non-transitory computer-readable medium storing instructions that, when executed by a computing system, cause the computing system to perform operations comprising:

creating a profile for the user, wherein the profile includes information content rules and information delivery rules for receiving a set of information;

detecting, by a user device, a presence of one or more other devices based on at least one of an audio indication or a network detection;

in response to detecting the presence of the one or more other devices, receiving, by the user device, a request for authentication credentials in order to access the set of information;

entering, via the user device, the authentication credentials; and in response to the authentication credentials authenticating the user associated with the user device, receiving the set of information in a format that is based on the user device, and i) a time of day, or ii) at least one user preference of the user.

14. The non-transitory computer-readable medium of claim 13, wherein the operations further comprise:

detecting, by the user device, the time of day; and in response to detecting the time of data, sending a trigger notification to receive the set of information.

15. The non-transitory computer-readable medium of claim 13, wherein the operations further comprise:

detecting, by the user device, a location of the user; and in response to detecting the location of the user, sending a trigger notification to receive the set of information.

16. The non-transitory computer-readable medium of claim 15, wherein the operations further comprise:

detecting, by the user device, a phrase spoken by the user; and in response to detecting the phrase spoken by the user, sending a trigger notification to receive the set of information.

17. The non-transitory computer-readable medium of claim 15, wherein the operations further comprise:

detecting a location of the user device using at least one of: a Wi-Fi signal, an RFID signal, an NFC signal, a satellite signal, or a cellular signal.

* * * * *